Dec. 16, 1969 D. R. GRAFHAM 3,484,626

SEQUENTIAL FLASHER CIRCUITS

Filed Dec. 28, 1966 2 Sheets-Sheet 1

INVENTOR:
DENIS R. GRAFHAM,
BY Urban H. Faubion
HIS ATTORNEY.

Dec. 16, 1969 D. R. GRAFHAM 3,484,626
SEQUENTIAL FLASHER CIRCUITS
Filed Dec. 28, 1966 2 Sheets-Sheet 2

INVENTOR:
DENIS F. GRAFHAM,
BY Urban H. Faubion
HIS ATTORNEY.

United States Patent Office 3,484,626
Patented Dec. 16, 1969

3,484,626

SEQUENTIAL FLASHER CIRCUITS

Denis R. Grafham, Auburn, N.Y., assignor to General Electric Company, a corporation of New York Filed Dec. 28, 1966, Ser. No. 605,415
Int. Cl. H03k *17/26*
U.S. Cl. 307—293 8 Claims

ABSTRACT OF THE DISCLOSURE

A circuit is provided for energizing two or more loads (e.g., lamps) sequentially and de-energizing all of the loads once all have been energized in order to start the sequential cycle over again which incorporates a series of parallel connected load normally open circuits which are connected across a supply terminal and a normally closed switch in the supply circuit which is opened in response to load current flowing through all of the parallel connected load circuits. A solid state switching means is provided which fires the first of the load current carrying solid state switches a predetermined time after energization at the circuit terminals and each subsequent load (lamps) of the parallel connected load circuits in sequence at a predetermined time after the preceding load circuit is rendered conductive thereby sequentially to render each of the load circuits conductive. Once all of the load circuits are conductive, they are all de-energized by the opening of the normally closed switch which closes again a predetermined time after opening in order to restart the firing cycle.

This invention relates to circuits of the type frequently referred to in the art as flashers or chaser circuits wherein a series of load devices (such as lamps) are energized in sequence with each load which is energized remaining energized until all loads are energized after which all loads are simultaneously de-energized and the cycle starts over again. Such circuits are useful in many applications including barricade flashers, rotating beacons, portable advertising signs and sequential turn signal systems for vehicles, etc.

The system specifically illustrated and described herein is a sequential turn signal for an automobile or other vehicle, however, it will be appreciated that other applications are within the contemplation of the present invention.

In general, known prior art circuits which perform the same general functions as those performed by the circuits of the present invention utilize mechanical switching arrangements which are subject to mechanical failures. Where solid state switches have been used in the past to avoid mechanical failures, highly elaborate circuits utilizing components which are relatively expensive have been used.

Accordingly, the present invention is directed to providing a solid state flasher circuit wherein highly reliable circuits and solid state circuit elements are used and a minimum number of circuit components are required.

Figure 1:
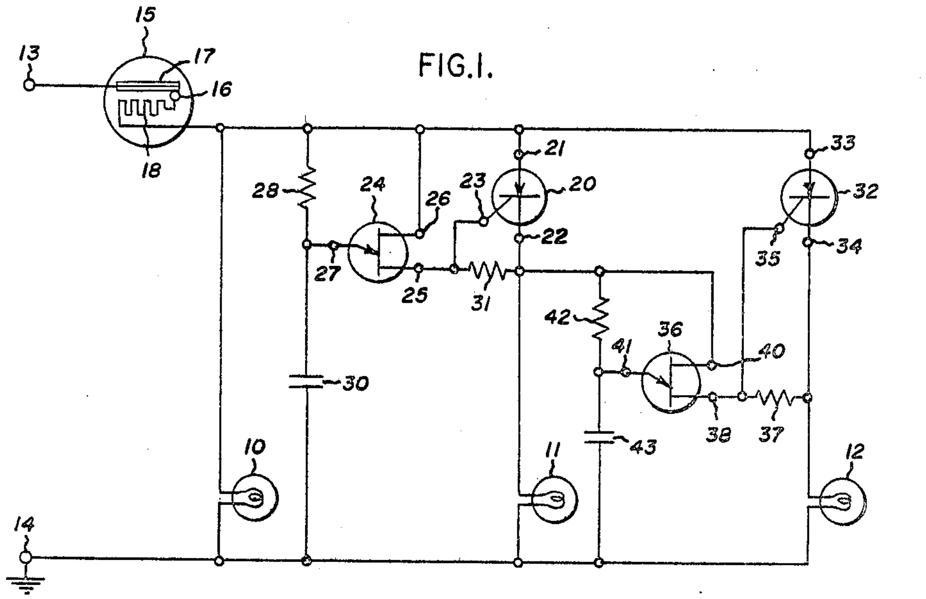
Figure 2:
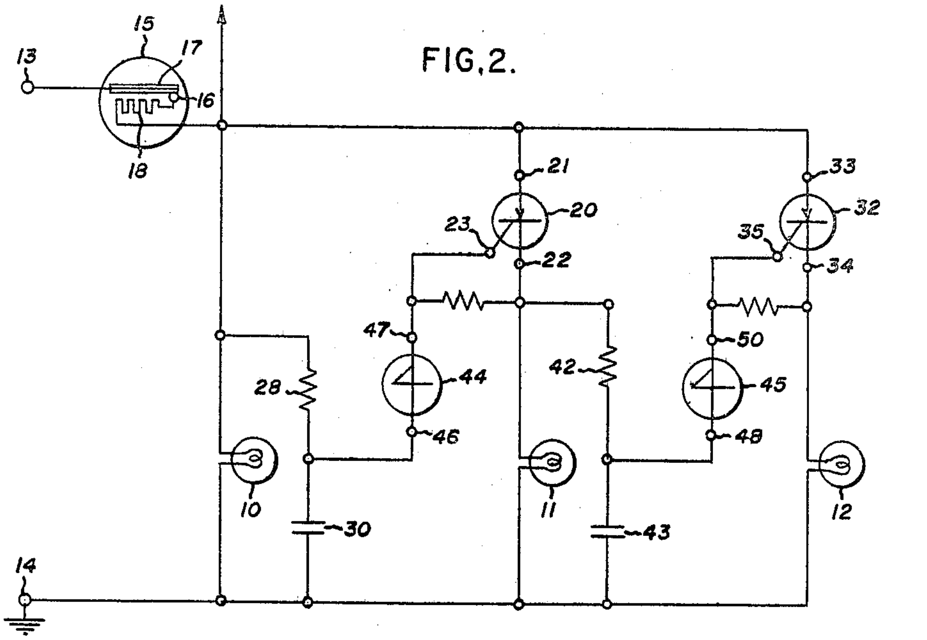
Figure 3:
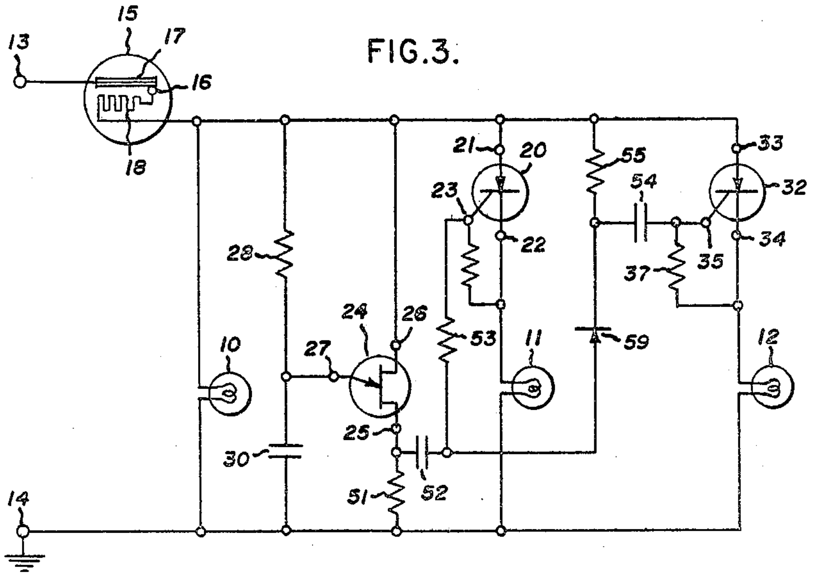
Figure 4:
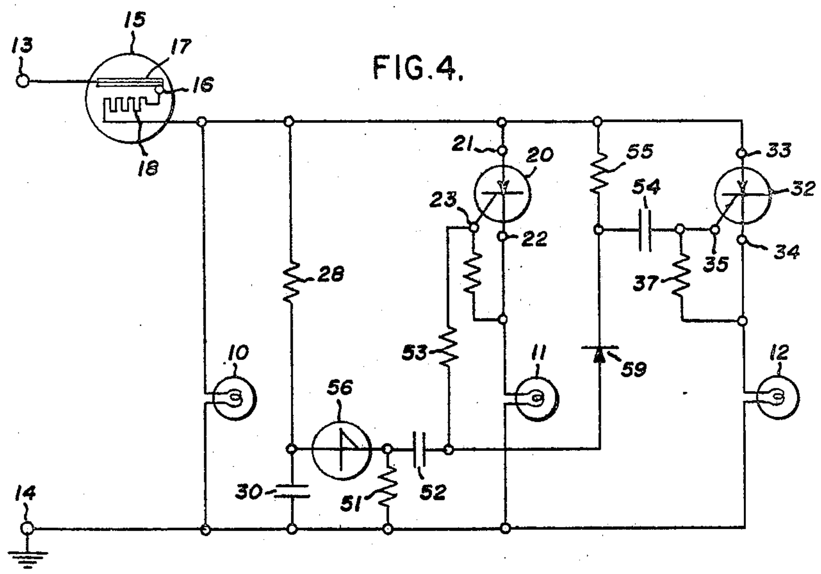

The novel features which are believed to be characteristic of the invention are set forth with particularity in the appended claims. The invention itself, however, both as to its organization and method of operation together with further objects and advantages thereof may best be understood by reference to the following description taken in connection with the accompanying drawing in which FIGURE 1 shows a schematic diagram of a circuit for sequentially energizing load circuits wherein each of the load circuits employs a solid state gate fired semiconductor switch and each of the switches is sequentially fired in response to signals from the output of unijunction oscillator circuits;

FIGURE 2 is a schematic diagram of a circuit which performs the same functions as the circuit of FIGURE 1 but wherein each of the solid state load energizing switches are fired in response to sequentially energized voltage fired semiconductor (silicon) unilateral switches; and FIGURES 3 and 4 are circuits for performing the functions of the circuits of FIGURES 1 and 2 but wherein the number of solid state elements required to fire the load energizing switches is reduced.

Referring specifically to FIGURE 1, schematic diagram of a flasher circuit of one embodiment of the invention is disclosed as it is used for turn signals of an automobile. In order to simplify the drawings and description only the right rear turn signal lights 10, 11 and 12 are illustrated. The turn switches are not shown nor are the front signal light systems shown. It will be recognized that the system illustrated can be duplicated for the left side of the automobile and front turn lights can be used either as single lights or the flasher system illustrated for the right rear turn signal may be duplicated in the front of the automobile. In order to indicate a right turn the inboard lamp 10 is first energized, then center lamp 11 is energized and next lamp 12 is energized. Once all three lamps are energized, a means is provided to de-energize all three and start the sequence again. Thus, a flashing arrow is simulated.

Power for the circuit illustrated is applied between input terminals 13 and 14 which represent the positive DC power supply and ground terminal 14 respectively. The means for resetting the system, that is, for disconnecting all of the lamps from the power source once all three lamps are energized comprises, in the embodiment illustrated, a conventional thermal flasher switch 15 which is normally closed. Flasher switch 15 has a contact 16 which is normally contacted by a conductive bimetal element 17 to complete the circuit. In order to provide for opening switch 15 a heater element 18 is positioned adjacent bimetal element 17 and connected in series circuit relation with switch contact 16. Heating element 18 normally only generates enough heat to cause the bimetal element 17 to deform and open the circuit after a period of time which is sufficient for all three of the sequentially energized signal lamps 10, 11 and 12 to become energized. After a period with all three lamps 10, 11 and 12 on, the thermal flasher opens, power is removed from the circuit and the lamps are extinguished. With the thermal flasher switch 15 open, heater 18 is no longer energized and the bimetal element 17 again closes on contact 16 again to apply power to the circuit and repeat the sequence.

It will be noted that the first lamp circuit (load circuit) only contains inboard lamp 10 connected directly across the input terminals 13 and 14 in series with the thermal flasher switch 15. Thus, inboard lamp 10 is energized whenever power is applied to input terminals 13 and 14 and thermal flasher switch 15 is closed.

In order to provide a means for center lamp 11 to be in a de-energized condition while inboard lamp 10 is energized a solid states switch 20 is provided in series with the center lamp and this center lamp circuit is connected in parallel with inboard lamp 10 across power input terminals 13 and 14. As illustrated, the solid state switch 20 in series with lamp 11 is of the type known in the art as a semiconductor controlled rectifier (SCR) which has an anode terminal 21, cathode terminal 22 and a gate terminal 23. Details of the operation of the SCR are not described here since its operation is well known in the art, and it is described in many publications. It should suffice to say that the SCR is normally in a high impedance state (essentially non-conducting) and can be fired or rendered conductive by application of the proper signal at the gate terminal 23.

As illustrated, in order to fire SCR 20 and energize the series circuit of center lamp 11, a unijunction transistor 24 is utilized in a relatively conventional unijunction transistor oscillator or time delay circuit. The unijunction transistor is provided with a first base terminal 25, a second base terminal 26 and an emitter terminal 27. The first base terminal 25 is connected directly to the gate electrode 23 of SCR 20 and the second base terminal 26 is connected directly to the positive power terminal 13 through thermal flasher switch 15. In order to provide the emitter supply and the proper time delay, a series circuit comprising a resistor 28 and capacitor 30 are connected directly in parallel with the series load or lamp circuits and the emitter terminal 27 of unijunction transistor 24 is connected directly to the juncture between the resistance 28 and capacitance 30. The circuit generates a pulsed output that triggers SCR 20 into conduction.

In the circuit of unijunction transistor 24 capacitor 30 charges from the direct current supply through resistor 28 until its voltage reaches a firing level for the unijunction transistor. The unijunction transistor then switches on between the emitter terminal 27 and the first base terminal 25 producing a sharp pulse at SCR gate terminal 23 as capacitor 30 is discharged through the unijunction transistor 24. Note here the gate to cathode circuit (internal) of SCR 20 provides the discharge path to ground. Biasing resistor 31 which is connected directly between the cathode and gate terminals 22 and 23 respectively of SCR 20 has a sufficiently high impedance to insure that the output discharge of unijunction transistor 24 fires SCR 20. The circuit of unijunction transistor 24 is called a unijunction oscillator because the pulse cycle repeats, however, it is not necessary to have the pulse cycle repeat in the circuit illustrated since once the SCR 20 is rendered conductive, it is not rendered non-conductive until the direct current supply voltage applied between anode and cathode terminals 21 and 22 of SCR 20 is reduced to zero. This only occurs when the thermal flasher unit 15 opens to remove power from the circuit or when the supply voltage at supply terminals 13 and 14 is removed.

The outboard lamp 12 is energized after the center lamp 11 in much the same manner that the center lamp 11 is energized after inboard lamp 10 is energized. That is, outboard lamp 12 is provided in a series circuit with an SCR 32 which also is fired by a unijunction time delay or oscillator circuit. Note SCR 32 is provided with electrodes 33 and 34 respectively which are in series with the outboard lamp 12 and this series circuit is connected directly across input terminals 13 nad 14 through flasher unit 15. SCR 32 is also provided with a gate electrode 35. SCR 32 is also provided with a biasing resistor 37 connected directly between its cathode and gate terminals 34 and 35 respectively. The unijunction transistor 36 forms the heart of the unijunction oscillator firing circuit for SCR 32 of the outboard lamp circuit. Unijunction transistor 36 is provided with first and second base terminals 38 and 40 respectively and emitter terminal 41. The series RC circuit which provides the capacitor discharge timing for the unijunction transistor oscillator is composed of resistor 42 and capacitor 43 connected directly in a series circuit across center lamp 11 and the emitter terminal 41 of unijunction transistor 36 is connected to the junction between the resistor 42 and capacitor 43. Since the series combination of resistor 42 and capacitor 43 are connected across center lamp 11, they are not energized until the center lamp 11 is energized. At this time capacitor 43 starts to charge and after a predetermined time lapse it reaches a voltage which fires unijunction transistor 36 again producing a pulse gate to cathode of SCR 32 thereby to cause the SCR to become conductive and energize lamp 12.

In this manner, all three of the lamps 10, 11 and 12 are energized sequentially and current is flowing through all three of the load circuits. After a period with all three lamps on, the thermal flasher 15 opens, power is removed from the circuits and the lamps are extinguished. The sequence repeats itself when the thermal flasher recloses. This cycle continues to repeat itself and the lamps continue to light sequentially until the voltgae source is removed from the circuit.

Another version of a sequential flasher is illustrated in FIGURE 2. As will be seen, most of the elements of the circuit of FIGURE 1 are found in the circuit of FIGURE 2 and, therefore, in order to simplify the description and drawing, like components are given the same reference numerals. The primary difference between the two circuits is that instead of the unijunction transistors 24 and 36 of FIGURE 1, silicon unilateral switches 44 and 45 are used to provide sequential firing. For this use of the silicon unilateral switch, only its anode and cathode terminals are used, thus, the silicon unilateral switch 44 has an anode terminal 46 connected to the juncture between the series connected resistor 28 and capacitor 30 and its cathode terminal 47 connected directly to gate terminal 23 of SCR 20.

Since the silicon unilateral switch is described in detail in the literature (see the article entitled "Using the Silicon Bilateral/Unilateral Switch" by Robert Muth which appears in the March 1966 issue of E.E.E. magazine, pages 78 through 85) it is not described in detail here. Although the theory of operation of the silicon unilateral switch is quite different from that of the unijunction transistor, in this particular context, the net result is approximately the same. That is, the unilateral switch 44 appears as an open circuit when a positive voltage of less than something between 6 and 8 volts is applied to the anode with respect to the cathode. Thus, in this instance when capacitor 30 charges up through resistor 28 to a value of something approximating 7.5 volts silicon unilateral switch 44 becomes conductive and thereby applies a firing current to the gate terminal 23 of SCR 20 which then causes the SCR to become conductive and center lamp 11 to become energized. After a period of time, capacitor 43 becomes charged to a value of approximately 7.5 volts. Since silicon unilateral switch 45 has its anode electrode 48 connected directly to the junction between resistor 42 and capacitor 43 and its cathode terminal 50 connected directly to gate electrodes 35 of SCR 32 capacitor 43 switches the silicon unilateral switch 45 to its conductive state and fires the SCR 32 in the outboard lamp circuit, thereby to energize outboard lamp 12.

Thus, it is seen that lamps 10, 11 and 12 are sequentially fired in the circuit of FIGURE 2 in a manner which is in time sequence the same as in the circuit of FIGURE 1. Since the thermal flasher 15 is also used in the circuit of FIGURE 2, it opens and closes as described previously to reset the circuit and provide for repeated sequential energization of the lamps.

The circuits of FIGURES 4 and 5 are preferred over those of FIGURES 1 and 2 primarily because they can be made at lower cost and without loss of highly reliable performance. That is, they are made at lower cost since the circuit arrangements for sequencing the energization of the lamps in the circuits require only one solid state switching means to control the SCRs.

Referring specifically to FIGURE 3, again the elements which are common to FIGURE 1 are given like reference numerals in order to simplify the description and drawings. Further, since the energization of the lamps 10, 11 and 12 follow the same sequence and the sequence is recycled in the same way as the circuit of FIGURE 1, the total operation of the device is not repeated. However, those elements which are different and the portion of the sequencing which is accomplished in a different manner are described.

The first difference between the circuits of FIGURES 1 and 3 is the manner of the utilization of the output of the unijunction oscillator which fires SCR 20 and energizes the center lamp 11. The difference here is in the manner of connecting base one 25 of unijunction transistor 24 in the circuit. Instead of connecting emitter base one 25 directly to gate electrode 23 of SCR 20, it is connected to the ground terminal through a resistor 51, thus once the inboard lamp 10 is energized through thermal flasher 15, voltage is applied to the series connected resistance 28 and capacitor 30 and after a predetermined period (here about ¼ second) unijunction transistor 24 is fired, producing a voltage pulse across resistor 51 to ground. Notice a capacitor 52 and resistor 53 are connected directly from the juncture between resistor 51 and base one 25 of unijunction transistor 24. Thus, after a predetermined period of time the output pulse which appears across resistor 51 is coupled to capacitor 52 and resistor 53 to gate electrode 23 of SCR 20 to trigger SCR 20 into conduction thereby energizing center rear signal lamp 11. Thus, rear inboard lamp 10 and rear center lamp 11 are energized.

The firing arrangement for SCR 32 in the circuit of outboard lamp 12 is entirely different from the previously described circuits. Note that the voltage which appears across resistor 51 in the circuit of unijunction transistor 24 is also coupled with capacitor 52 directly to a diode rectifier 59 which is of a polarity to conduct in the direction of the circuit being traced, and a capacitor 54 directly to gate terminal 35 of the outboard lamp firing SCR 32. It is possible that this circuit would fire SCR 32, except that the juncture between diode 59 and capacitor 54 is connected directly to the positive terminal 13 through a resistor 55. Resistor 55 is selected so that the charging current which establishes the blocking charge on capacitor 54 is insufficient to trigger SCR 32 into conduction. Thus, the reason the SCR 32 which ultimately controls energization of outboard lamp 12 does not fire upon firing of the circuit of the unijunction transistor 24 is that resistor 55 and capacitor 54 form a voltage blocking circuit which back biases diode rectifier 59.

With SCR 20 conductive and the center rear lamp 11 energized, the gate electrode 23 and cathode electrode 22 of SCR 20 rise to substantially the supply voltage less the conduction drop of SCR 20 and capacitor 52 charges to this potential through resistors 51 and 53. When the circuit of unijunction transistor 24 produces a second pulse (fires for the second time) the rectifier 59 is no longer back biased (because of the voltage rise of capacitor 52), and the output pulse from the unijunction transistor oscillator passes through diode rectifier 59 to fire SCR 32. Outboard signal lamp 12 is then energized. Again, after a period with all three lamps energized, thermal flasher 15 opens, power is removed from the circuit and the lamps are extinguished. The sequence repeats when the thermal flasher recycles.

In the circuit of FIGURE 4, almost all of the circuit elements are the same as those in FIGURE 3, however, again a silicon unilateral switch 56 appears in place of the unijunction transistor 24 of the circuit of FIGURE 3. The other elements of the circuit contain like reference numerals and aside from the theory of operation of the silicon unilateral switch which was previously discussed, the same general operation is obtained as is described for the circuit of FIGURE 3.

While particular embodiments of the invention have been shown, it will, of course, be understood that the invention is not limited thereto since many modifications in the circuit arrangements and in the instrumentalities employed may be made. It is contemplated by the appended claims to cover any such modifications as fall within the true spirit and scope of the invention.

What I claim as new and desire to secure by Letters Patent of the United States is:

1. In combination in a circuit for energizing a plurality of load devices in sequence and deenergizing the load devices after all are energized, a pair of supply terminals for connection to a supply source, at least two load circuits each connected between said supply terminals for energization by a voltage supplied across said terminals and in parallel with each other, a first normally non-conducting solid state switch means connected in series in at least one of said parallel load circuits whereby said load circuit can be selectively rendered conductive and non-conductive by said solid state switch means, a second solid state switch means connected across said supply terminals in parallel with said load device controlled by said first solid state switch means to be rendered conductive after current in the first one of said two load circuits and to fire said first solid state switch means upon being rendered conductive thereby assuring sequential conduction of said two load circuits, and normally conductive load current responsive switch means connected in series with said parallel connected load circuits and said second switch means for opening said load circuits after all said load circuits are energized to disconnect said load circuits from said supply and for closing a period of time after load current ceases to flow in said load circuits thereby to reset said system for repetitive sequential energization of said load circuits.

2. A circuit as defined in claim 1 wherein said normally conductive load current responsive switch is a thermally responsive switch which is opened in response to heat generated by load current.

3. A circuit for repetitively energizing a plurality of load devices sequentially and de-energizing the load devices after all are energized including in combination, a pair of supply terminals for connection to a supply source, at least two load circuits each connected between said supply terminals for energization by a voltage supplied across said terminals and in parallel with each other, a normally conductive load current responsive switch means connected in series with all of said parallel connected load circuits for opening when all said load circuits are energized at one time thereby to disconnect said load circuits from said source and to close again a predetermined time after load current ceases to flow in said load circuits thereby to reset said system, first and second normally non-conducting solid state switch means each connected in series circuit relation in first and second ones of said load circuits respectively whereby each said first and second load circuits are normally non-conductive and can be effectively rendered conductive by rendering the respective solid state switch means conductive, third solid state switch means comprised of a single semiconductor switching means connected in series with said current responsive means and in parallel with said load circuits controlled by said first and second solid state switching means, to be rendered conductive a predetermined period of time after energization by a source at said supply terminals and sequentially to fire first said first solid state switch means thereby to render said first load circuit conductive then to fire said second solid state switch means thereby to render said second load circuit conductive whereupon all said load circuits are energized and said load current responsive switch means disconnects all said load circuits thereby to start a new cycle.

4. A circuit as defined in claim 3 wherein normally conductive load current responsive switch is a thermally responsive switch which is opened in response to heat generated by load current.

5. A circuit for repetitively energizing more than one load device sequentially and de-energizing the load devices after all are energized including in combination, a pair of supply terminals for connection to a supply source, at least two load circuits each connected between said input terminals for energization by a voltage supplied across said terminals and in parallel with each other, a normally conductive load current responsive switch means connected in series with all of said parallel connected load circuits, said load current responsive switch means responsive to energy supplied to said load circuits to open when all said load circuits are energized at one time thereby to disconnect said load circuits from said source and to close again a predetermined time after load current ceases to flow in said load circuits thereby to reset said system, first and second normally non-conducting solid state switch means each connected in series circuit relation in first and second ones of said load circuits respectively whereby each said first and second load circuits are normally non-conductive and can be effectively rendered conductive by rendering the respective solid state switch means conductive, third solid state switch means connected to be rendered conductive a predetermined period of time after energization by a source at said supply terminals and sequentially to fire first said first solid state switch means thereby to render said first load circuit conductive then to fire said second solid state switch thereby to render said second load circuit conductive whereupon all said load circuits are energized and said load current responsive switch disconnects all said load circuits thereby to start a new cycle wherein said third solid state switch means includes a single unijunction transistor oscillator circuit and a voltage blocking circuit, said first unijunction transistor oscillator circuit connected to deliver output pulses to said first solid state switch means and said voltage blocking circuit thereby to render said first solid state switch means and said first load circuit conductive, said blocking circuit connected to deliver an output to said second solid state switch after an input voltage is supplied of sufficient magnitude to overcome its voltage blocking level, means to raise the voltage level of output pulses from said unijunction oscillator to a level sufficient to overcome said blocking circuit upon conduction of said first solid state switch means thereby to render said second solid state switch means and said second load circuit conductive after conduction of said first load circuit.

6. A circuit for repetitively energizing more than one load device sequentially and de-energizing the load devices after all are energized including in combination, a pair of supply terminals for connection to a supply source, at least two load circuits each connected between said input terminals for energization by a voltage supplied across said terminals and in parallel with each other, a normally conductive load current responsive switch means connected in series with all of said parallel connected load circuits, said load current responsive switch means responsive to energy supplied to said load circuits to open when all said load circuits are energized at one time thereby to disconnect said load circuits from said source and to close again a predetermined time after load current ceases to flow in said load circuits thereby to reset said system, first and second normally non-conducting solid state switch means each connected in series circuit relation in first and second ones of said load circuits respectively whereby each said first and second load circuits are normally non-conductive and can be effectively rendered conductive by rendering the respective solid state switch means conductive, third solid state switch means connected to be rendered conductive a predetermined period of time after energization by a source at said supply terminals and sequentially to fire first said first solid state switch means thereby to render said first load circuit conductive then to fire said second solid state switch thereby to render said second load circuit conductive whereupon all said load circuits are energized and said load current responsive switch disconnects all said load circuits thereby to start a new cycle wherein said third solid state switch means includes a normally non-conductive single unilateral switch and a voltage blocking circuit, said unilateral switch connected to be rendered conductive a predetermined time after application of voltage across said first and second load circuits and connected to deliver a voltage to said first solid state switch means and said voltage blocking circuit thereby to render said first solid state switch means and said first load circuit conductive, said blocking voltage connected to deliver an output to said second solid state switch after an input voltage is supplied of sufficient magnitude to overcome its voltage blocking level, means effectively to raise the voltage level of the output from said unilateral switch upon conduction of said first solid state switch means thereby to render said second solid state switch means and said second load circuit conductive after conduction of said first load circuit.

7. In combination in a circuit for energizing a plurality of load devices in sequence and de-energizing the load devices after all are energized first and second load circuits connected in parallel each including a semiconductor controlled rectifier and a load connected in series, first solid state switch means connected in parallel with said load circuits to render said semiconductor controlled rectifier associated with said first load circuit conductive a predetermined time after energization thereof, second solid state switch means connected in parallel with said load of said first load circuit and in series with said semiconductor controlled rectifier thereof to render said remaining semiconductor controlled rectifier associated with said second load circuit conductive a predetermined time after energization of said first load circuit, and normally conductive load current responsive switch means connected in series with said parallel connected load circuits and said solid state switch means for opening after all said load circuits are energized and for closing a period of time after load current ceases to flow in said load circuits thereby to reset said system for repetitive sequential energization of said load circuits.

8. In combination in a circuit for energizing a plurality of load devices in sequence and de-energizing the load devices after all are energized first and second load circuits connected in parallel each including a semiconductor controlled rectifier and a load connected in series, first solid state switch means including a silicon unilateral switch connected between a capacitive charging circuit in parallel with said load circuits and a gate associated with said semiconductor controlled rectifier in said first load circuit to render said first load circuit conductive a predetermined time after energization thereof, second solid state switch means connected in parallel with said load of said first load circuit and in series with said semiconductor controlled rectifier thereof to render said remaining semiconductor controlled rectifier associated with said second load circuit conductive a predetermined time after energization of said first load circuit, and normally conductive load current responsive switch means connected in series with said parallel connected load circuits and said solid state switch means for opening after all said load circuits are energized and for closing a period of time after load current ceases to flow in said load circuits thereby to reset said system for repetitive sequential energization of said load circuits.

References Cited

UNITED STATES PATENTS 3,162,772 12/1964 Smith ............... 307—293

JOHN S. HEYMAN, Primary Examiner

B. P. DAVIS, Assistant Examiner

U.S. Cl. X.R.

307—252, 305, 318; 315—323; 340—82